Figure 1:
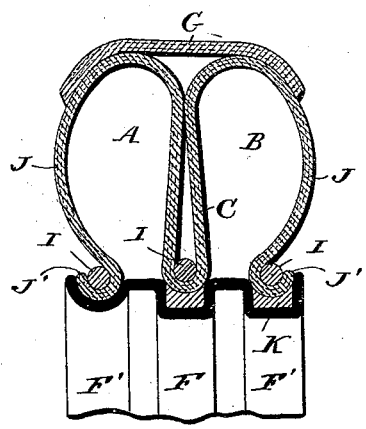

(No Model.)

C. H. GRAY.
WHEEL TIRE.

No. 543,862. Patented Aug. 6, 1895.

Witnesses
Jno. G. Hinkel
J. A. Fairgrieve

Inventor
Christian H. Gray
by Saxter Freeman
Attorneys

UNITED STATES PATENT OFFICE.

CHRISTIAN HAMILTON GRAY, OF SILVERTOWN, ENGLAND.

WHEEL-TIRE.

SPECIFICATION forming part of Letters Patent No. 543,862, dated August 6, 1895.

Application filed December 20, 1894. Serial No. 532,431. (No model.)

*To all whom it may concern:*

Be it known that I, CHRISTIAN HAMILTON GRAY, a subject of the Queen of England, residing at Silvertown, Essex, England, have invented certain new and useful Improvements in or Relating to Tires for Wheels or the Like, of which the following is a specification.

This invention relates to tires, particularly those inflated by air or other suitable fluid, applicable to cycles and other vehicles, wheels, drums, or the like.

In carrying out this invention as a tire for road vehicles, particularly cycles, I form it with two or more compartments, each of which in some cases may be complete single-tube tires and in other cases may have air-tubes inside them. In the former case no means of access to the interior would be required, but in the latter case such means of access would be necessary. In all cases, however, I employ a wall, diaphragm, web, or equivalent, directly connecting the outer periphery with the wheel-rim, so as to obtain as direct a pull as possible from the rim of the wheel to the outer periphery of the tire.

The precise shape of the tires may vary without departing from the spirit of the invention. For example, where the outer walls join the diaphragm, or by joining form the diaphragm, they may be drawn in, so as to form a curve approaching the diaphragm, thus presenting a central groove all round the tread of the tire. This groove may, however, be covered over, or bridged, or filled up with rubber, leather, or other suitable material in any desired manner. The diaphragm being for the purpose specified, may, where desired, be not a complete wall between the two tires, but might be made of a number of strips or threads of material so arranged as to give the desired direct pull. Also where a complete diaphragm is employed it may be provided with any number of openings to allow of the fluid passing from side to side.

In the case of a tire having interior air-tubes, the outer cover would be arranged to provide the two tubes or spaces, and its edges may be connected with the rim in any desired manner, as by wires, solution, or other devices. In some cases I may employ a cover divided into two parts, as previously described, and connect the edges with the rim by suitable adhesive—say, for example, raw rubber—which may be readily rendered adhesive again after the cover has been drawn off it by the application of naphtha.

The central wall or diaphragm may be secured to the rim by a wire or equivalent in any desired manner, the rim being, if necessary, specially shaped to provide for this.

In one case of a tire I form the rim with two gutters of ordinary description and a central raised platform, preferably raised very considerably above the gutters, and if necessary provided with a central peripheral groove, in which the wire or other attachment holding the wall may lie. This form of rim cuts out, as it were, a large portion of the center of the tire and considerably reduces the total air-space.

The inflation may be effected in any desired manner, preferably by means of a breeches-pipe or equivalent and double valves.

Figure 2:
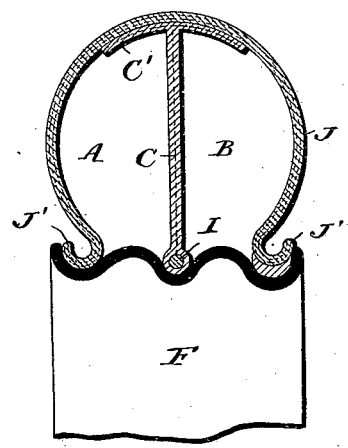
Figure 3:
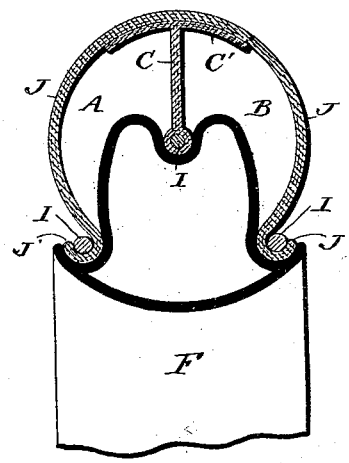
Figure 4:
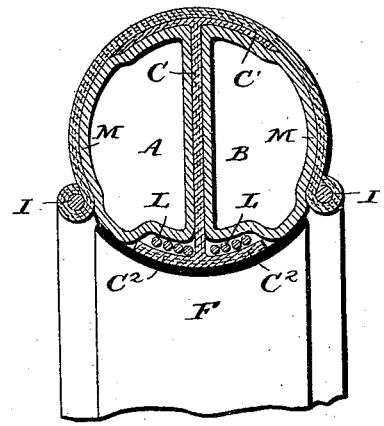

In the accompanying drawings, Figure 1 is a transverse section of a tire embodying my improvements, and Figs. 2, 3, and 4 are similar views of modifications thereof.

The improved tire is provided with two compartments A B on opposite sides of a vertical diaphragm C, which extends from and directly connects the outer periphery of the tire to the rim F of the wheel.

In Fig. 1 a tire is shown which is intended to be secured to the rim F by means of wires or other non-stretchable ligatures I, pressing upon the edges J' of the cover J, so as to press them into the gutters F', formed upon the edges of the rim F. This tire may have an air-tube in the compartments A and B, or if the joints with the rim at the edges and center are made air-tight special air-tubes would not be necessary. The central wire or ligature I is intended to be permanent, and would only be released in case it was found necessary to remove the tire altogether from the rim; but either of the others may be made detachable and have their ends connected by suitable coupling in any convenient manner. Upon the right-hand side of this figure the gutter F' is shown deeper and provided with a packing-strip K, preferably of rubber, upon which the edge J' is bedded by the wire I. A similar arrangement is adopted for the central gutter F. The left-hand gutter F′, however, is shown approximately simicircular, the edge J′ of the cover bedding snugly therein without the employment of the rubber packing K′. Cement or similar means may be employed for making an air-tight joint between the cover and this gutter. In this example the tire consists of a single strip of material folded, as clearly indicated in the drawings, and having a strip G on its periphery, the two central folds lying contiguous to each other and forming the diaphragm or central wall C. Any suitable materials may be employed in the manufacture of these tires, but usually rubber and canvas or rubber with threads embedded therein would be employed in their construction.

In Figs. 2, 3, and 4 the same idea is carried out with slight modifications. Fig. 2 is in many respects similar to Fig. 1, but the shape of the rim is different, and the cover, instead of being folded, as in Fig. 1, is carried round from one edge J′ to the other edge J′, while the central wall or diaphragm C is formed, as it were, with a T-head C′, which may be vulcanized or solutioned to the inside of the cover J. The three wires or other non-stretchable binding-hoops I would be employed in this figure, as in Fig. 1, and in a substantially similar manner. The rim is of a curved section to suit the tire, and on one side the packing-strip K is shown, but not on the other. It will be understood, however, that in all cases the packing-strips may be used upon one, both, or neither side, according to requirement.

Fig. 3 is substantially the same as Fig. 2, excepting that the shape of the rim is altered, a hollow rim being employed, and the periphery thereof is brought up into the interior of the tire, so that only a short wall C is required. Other features will be similar to Fig. 2.

In Fig. 4 a tire in many respects similar to Fig. 2 is shown; but the wall C is provided with two heads C′ and C², the latter being secured in the crescent-shaped rim F by binding-wires or an equivalent ligature L, which may be regarded as a permanent fastening. The edges of the cover in this case do not take a direct hold upon the rim, but terminate with the wire or other non-stretchable hoops I in their edges, which, being non-stretchable, will prevent the cover from escaping from the rim, besides which the wall C, fastened as above described, would secure the tire in case of puncture. Separate air-tubes M are shown inside the cover in this figure.

I am aware that more than one air-tube inside a cover has before now been employed or proposed to be employed, Thomson's British specification No. 10,990 of 1845 showing an arrangement of a number of air-tubes inside a cover. Also two air-tubes with their edges abutting at the center, so as to make, as it were, a diaphragm, were suggested by Owen in his British specification No. 19,522 of 1893; but the mere meeting of these two thin rubber air-tubes would not form the central wall or diaphragm C described in my specification, one of the necessary elements of which is that it would be non-stretchable, while the unsupported rubber of Owen's air-tubes would be eminently stretchable and would not convey the power from the rim of the wheel to the periphery or tread of the tire, as is the case with my central wall C.

I claim—

1. In a wheel the combination with the rim of a flexible hollow tire and an unstretchable diaphragm secured to the tire near the tread surface and extended therefrom into operative connection with the rim, substantially as set forth.

2. In a wheel the combination with the rim of a flexible hollow tire formed of a folded strip or sheet and an unstretchable diaphragm secured to the tire near the tread surface and extended therefrom into operative connection with the rim, the unstretchable diaphragm being formed by adjacent folded portions of the tire, substantially as set forth.

In testimony whereof I have hereto set my hand in the presence of the two subscribing witnesses.

CHRISTIAN HAMILTON GRAY.

Witnesses:
ALFRED J. BOULT,
HARRY B. BRIDGE.